(12) United States Patent
Roche et al.

(10) Patent No.: US 8,490,982 B2
(45) Date of Patent: Jul. 23, 2013

(54) WINDBACK DEVICE

(75) Inventors: Brian Roche, Schwenksville, PA (US); Glenn Garrison, Perkiomenville, PA (US); Hiren Patel, Harleysville, PA (US); John Eppehimer, Fleetwood, PA (US); Manik Vasagar, Hatfield, PA (US); Mark Sanville, Souderton, PA (US); Saji Pillai, Collegeville, PA (US)

(73) Assignee: Stein Seal Company, Kulpsville, PA (US)

( * ) Notice: Subject to any disclaimer, the term of this patent is extended or adjusted under 35 U.S.C. 154(b) by 908 days.

(21) Appl. No.: 12/125,133

(22) Filed: May 22, 2008

(65) Prior Publication Data
US 2009/0322031 A1   Dec. 31, 2009

(51) Int. Cl.
*F16J 15/40* (2006.01)
*F16J 15/44* (2006.01)
*F16J 15/447* (2006.01)
*F01D 11/02* (2006.01)

(52) U.S. Cl.
USPC ............ 277/430; 277/411; 277/412; 277/418

(58) Field of Classification Search
USPC ............... 277/348, 354, 412, 430, 411, 418
See application file for complete search history.

(56) References Cited

U.S. PATENT DOCUMENTS

| | | | |
|---|---|---|---|
| 1,720,696 A * | 7/1929 | Simpson | 277/346 |
| 2,681,837 A * | 6/1954 | Boyd et al. | 384/466 |
| 4,082,296 A | 4/1978 | Stein | |
| 4,334,687 A * | 6/1982 | Holzer et al. | 277/430 |
| 5,039,115 A * | 8/1991 | Hebert et al. | 277/347 |
| 5,284,347 A | 2/1994 | Pope | |
| 5,301,957 A * | 4/1994 | Hwang et al. | 277/350 |
| 5,322,298 A | 6/1994 | Maier | |
| 5,499,901 A * | 3/1996 | Rockwood | 415/111 |
| 5,503,407 A | 4/1996 | McNickle | |
| 5,735,530 A * | 4/1998 | Merkin et al. | 277/412 |
| 5,813,830 A * | 9/1998 | Smith et al. | 415/170.1 |
| 6,015,153 A * | 1/2000 | Sharrer | 277/412 |
| 2003/0030223 A1* | 2/2003 | Rinaldo | 277/412 |
| 2007/0057471 A1* | 3/2007 | Rentschler | 277/559 |
| 2008/0197575 A1* | 8/2008 | El-Aini et al. | 277/303 |
| 2008/0265513 A1* | 10/2008 | Justak | 277/301 |
| 2008/0284105 A1* | 11/2008 | Vasagar et al. | 277/306 |

* cited by examiner

*Primary Examiner* — Vishal Patel
*Assistant Examiner* — Michael Wills, III
(74) *Attorney, Agent, or Firm* — Michael Crilly, Esq.

(57) ABSTRACT

The present invention relates to a windback device and method of use to prevent lubricant from leaking from a lubricant sump. More specifically, the present invention is comprised of a windback device within a lubricant sump formed from the coupling of an annular sump housing, an annular fluid seal assembly, and a bearing. The annular housing substantially surrounds the runner to form a chamber. The seal assembly is coupled to a sump housing both of which are adapted to receive a rotatable runner such that a sealed chamber is formed around the runner. A plurality of inclined threads extend along an inner face of the windback device and are angled such that lubricant or fluid splashed from the rotating shaft is redirected away from a shaft seal element of the annular fluid seal and through leak off slots leading to the sump housing chamber.

12 Claims, 11 Drawing Sheets

WINDBACK DEVICE

BACKGROUND OF THE INVENTION

1. Field of the Invention

This invention is directed to a windback device with a rotating shaft and positioned between a lubricant sump and a shaft seal so as to prevent lubrication fluid from reaching the seal.

2. Description of the Prior Art

With rotating shafts, lubricant sumps are frequently required along segments of the shaft to provide lubrication for shaft bearings and the like. It is frequently desirable to isolate the lubricant sump from remaining media in which the shaft is immersed, as well as to assure that the lubricant remains in the sump so that (1) lubrication of the bearings may continue and (2) the lubricant does not contaminate any other media in which the shaft is immersed.

For example, in gas turbine applications the lubricant sump is typically isolated from the remainder of the gas turbine housing by the sump housing and a shaft seal. The remainder of the gas turbine housing, or a compartment adjacent thereto, is typically filled with gases at temperatures and pressures higher than those desired in the lubricant sump. It is often important to prevent lubricant from mixing with gas contained in such high temperature gas and/or pressurized compartments. For example, when an oil lubricant is used, mixing the oil with the gas could result in formation of oil coke, which is a byproduct of oil heated to an elevated temperature and which chemically alters the oil and hence is detrimental to the gas turbine. Oil coke can foul seal surfaces and prevent proper bearing lubrication. Accordingly, it is important in many applications that the lubricant be isolated within a lubricant sump.

To accomplish such sump isolation, a shaft seal is normally positioned adjacent to the sump and around a rotatable shaft passing therethrough. While the sump is typically at a lower pressure than the remainder of the turbine, research has shown that pressure differentials within the sump are such that lubricants held within the sump are encouraged to travel along the rotating shaft toward the seal. These pressure differentials, along with shaft windage, tend to move the lubricant out of the sump and along the shaft, a phenomenon often termed "lubricant splash," which results in loss of lubricant from the lubricant sump.

Some sealing means, such as the shaft seal, are normally provided to at least minimize if not prevent lubricant splash and lubricant loss. However, the shaft seal, which typically is a segmented carbon rubbing seal, may have the carbon sealing faces contaminated by the lubricant if the lubricant reaches the seal. Such contamination of the seal can compromise the integrity of the seal and reduce the efficiency with which the seal isolates the lubricant within the lubricant sump.

To prevent lubricant splash from reaching the carbon sealing faces or other parts of the seal, a windback device is typically interposed along the shaft, between the seal and the lubrication sump. The windback device normally has an annular collar-like member, receiving the shaft in the opening of the collar-like member, and a screw pitch or thread in the radially inward surface of the collar-like member that faces the shaft. The windback device is typically secured to the housing to prevent lubricant leakage from the sump to the remainder of the housing except along the shaft. The shaft seal is normally interposed between the windback device and the shaft, with the seal located along the shaft, on the side of the windback device that is remote from the sump in order to prevent lubricant leakage along the shaft.

Since a windback device is typically in close proximity to the associated shaft, yet not so close as to expect to create a pressure drop along the shaft, initial conventional wisdom was that pressure along the opening in the windback device, namely at positions in the windback device opening that were adjacent to the rotating shaft, would be essentially constant along the length of the shaft within the windback device. As a result of this assumption, conventional wisdom was that any lubricant splash moving along the shaft of the windback device would likely flow back toward the sump along the threaded inner surface of the windback collar.

A number of pressure measurements taken along the axial length of the windback device showed the surprising result that a pressure drop actually existed between the sump and the end of the windback device remote from the sump. Measured pressure at the sump end of the windback opening was greater than measured pressure at the seal end of the windback opening. Thus, lubricant was encouraged, by this pressure different in an unexpected direction, to move away from the sump along the shaft to other interior portions of the shaft housing, responsively to the pressure drop along the windback in that direction.

In applications such as gas turbines, the pressure of the lubricant medium in regions other than in the sump is higher than the pressure within the sump. Thus, one would expect that the lubricant pressure in the sump, adjacent to the seal, would be higher than the lubricant pressure in the remainder of the sump. However experiments have shown that, even in such applications, the pressure in the sump adjacent the seal was lower than the pressure in the remainder of the sump, thus causing additional lubricant flow along the shaft towards the seal. Because of this unexpected pressure profile, windback devices prior to the aforementioned research failed to fully prevent the flow of lubricant toward the seal.

U.S. Pat. No. 5,503,407 addressed the aforementioned research discloses one solution to this problem. Specifically, referring to FIG. 1 of this application, which has been adapted from a similar figure in '407, '407 discloses a windback as part of a circumferential seal assembly within a lubricant sump. The seal assembly, specifically the windback, has an internal helical thread (A) machined on the bore of the housing, wherein, a shaft passes through and rotates within the bore. When the shaft rotates, windage results in the clearance between the windback and the shaft. Lubricant droplets entering between the windback and shaft clearance from the lubricant side are, thereby, forced on the helical thread (A) due to the effect of windage drag. The lubricant droplets are further forced by the shearing stress on the thread surface to move circumferentially along the helical thread (A) to a single windback bleed-off slot (B) wherein the lubricant is returned to the lubricant sump.

Figure 1:
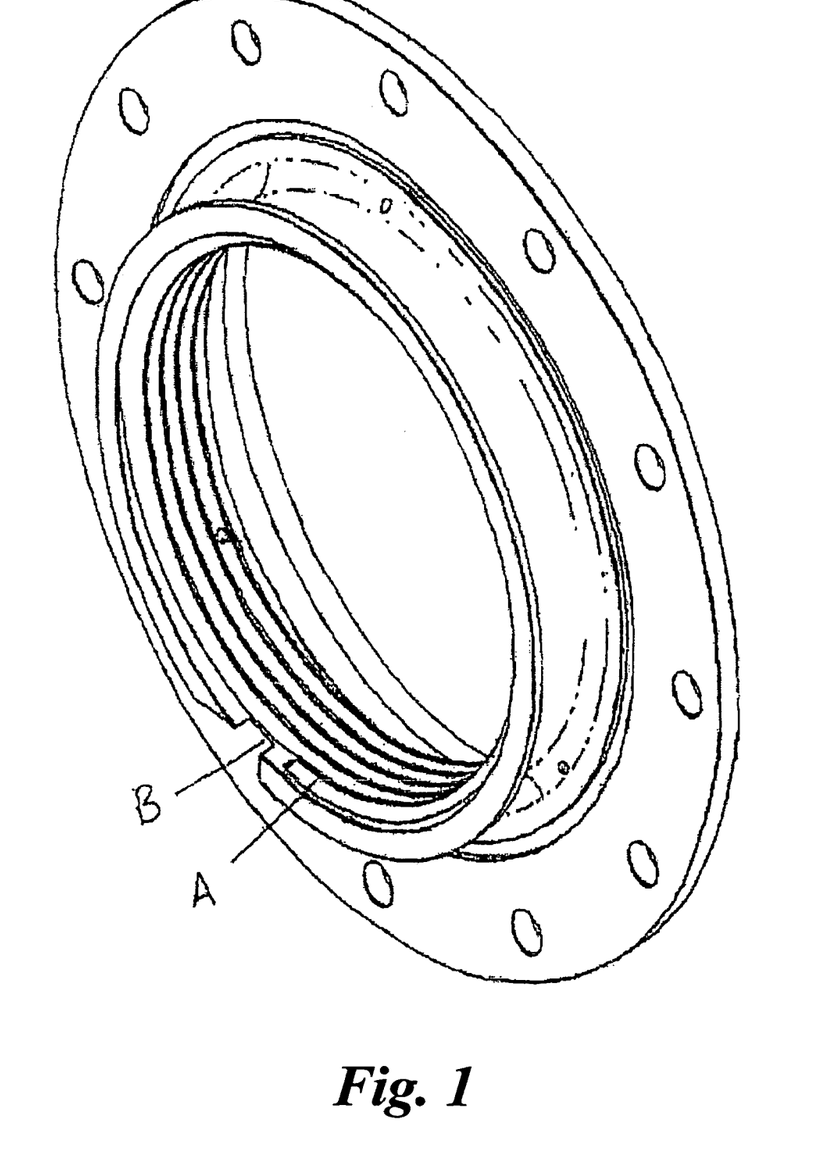
FIG. 1 is an isometric view of a prior art windback device.

This helical thread windback design of the '407 patent causes the lubricant droplets to travel several times around the circumferential distance deferred by the helical thread (A) of the windback to the singular leak-off slot (B) before dropping into the lubricant side. Ultimately, the circumferential distance around the windback helical thread (A) combined with only one leak-off slot decreases the ability of the helical thread of the windback '407 to efficiently pump the lubricant back into the sump. The additional distance and single leak off slot also increases the risk that the windback will clog or be backed up with lubricant, reducing efficiency of the helical thread (A).

An alternate, earlier solution is presented by U.S. Pat. No. 5,322,298. More specifically, '298 discloses a windback with first and second annular grooves. The annular grooves are perpendicular to the plane of the shaft and are spaced such that the first annular groove defines a distal end of the windback relative to the lubricant sump and the second annular groove is at a proximal end of the windback relative to the lubricant sump. Both annular grooves substantially surround the shaft. Threads extend along the windback bore at an oblique angle, relative to the longitudinal axis of the shaft, between the first and second annular grooves. In operation, lubricant drops entering between the windback and the shaft are deposited into the oblique threads by the windage drag. The shearing stress caused by the rotation of the shaft forces the fluid to move along the oblique threads and into the annular grooves. However, there is no leak-off slot to release build up of fluid from the annular grooves. To this end, in '298 fluid can build within the grooves, leading to a decrease in the windage pumping efficiency and reintroduction of lubricant into the space between the shaft and the windage.

Accordingly, a windback device is desirable that can efficiently redirect fluid entering the space between a windback and a shaft back into the sump and that can redirect the fluid flow, while reducing build-up of the fluid within the windback.

SUMMARY OF THE INVENTION

This invention provides a windback and method of use as part of a seal assembly, which preferably may be implemented to eliminate lubricant leakage from a lubricant sump. Specifically, the windback preferably utilizes multiple inclined threads, each with an individual leak off slot, to improve windage pumping efficiency of the windback.

This invention preferably includes a windback device within a lubricant sump formed from coupling an annular sump housing, an annular fluid seal assembly, a bearing, and a shaft. The annular sump housing preferably substantially surrounds the shaft to isolate a sump chamber wherein the shaft passes through the chamber and through at least one open end of the sump housing. One or more bearing assemblies preferably interface between the sump housing and the shaft such that the bearing assemblies are lubricated by lubricant, which may be contained within the sump chamber. A fluid seal assembly is adapted to be received by the open end of the sump housing through which the shaft passes. Specifically, the fluid seal assembly is preferably comprised of an annular seal housing with an annular flange at one end and a windback at an opposing end. The fluid seal assembly is preferably coupled to the open end of the sump housing by the annular flange such that the fluid seal housing and windback are held within the open end on an interior side of the sump chamber. The fluid seal housing, windback and flange substantially surround the runner and form a seal cavity therebetween. The seal cavity is adapted to receive a seal, which may be comprised of a plurality of segmented rings mechanically urged around the runner. The seal may be biased against a seal cavity wall, which is proximal to the windback, by a plurality of springs and support rings. By urging the seal against both the runner and a seal cavity wall, the seal and, ultimately, the fluid seal assembly isolate the sump housing chamber such that lubricant may be prevented from passing through the open end of the housing sump.

The windback includes an annular collar extending from the seal housing and substantially surrounding the shaft. Along an inner face of the collar are a series of ridges that are adapted to form between 1 and 24 inclined threads of either the same or varying dimensions. The threads preferably extend across the length of the collar at an oblique angle, relative to the axis of the runner. At an end of each thread, proximal to the lubricant sump and distal to the seal housing, is a leak-off slot leading to the lubricant sump.

The windback is positioned over the shaft such that the collar substantially surrounds the shaft, affording the windback optimal radial clearance as respecting the distance between the ridges and the shaft. Specifically, the radial clearance is such that the inclined threads receive lubricant deposited thereon by windage resulting from rotation of the shaft. The radial clearance allows shear forces generated by rotation of the shaft to move the lubricant along the threads and through the leak-off slots of each thread.

In operation, lubricant within the lubricant sump travels into the radial clearance between the shaft and the windback. Rotation of the shaft creates windage that splashes the lubricant into the threads of the windback. Sheer forces created by rotation of the shaft urge the lubricant along the threads such that the lubricant moves away from the seal and the seal housing, through the leak-off slots. Accordingly, the windback returns the lubricant back to the lubricant sump and prevents the lubricant from contacting the seal.

In summary, in one of its aspects this invention provides a windback utilizing multiple inclined threads, improving windage pumping efficiency. This prevents or at least reduces lubricant migration from a lubricant sump to the sealing face of a sealing ring.

In another of its aspects the invention provides a windback utilizing multiple inclined threads to prevent lubricant from leaking from the lubricant sump.

In another of its aspects the invention prevents lubricant leakage from a low pressure area, e.g. a lubricant sump, to a high pressure area, e.g. the gas side of a turbine engine.

In another of its aspects the invention redirects lubricant flow along a shaft back into a lubricant sump while reducing lubricant build-up within the windback.

DETAILED DESCRIPTION

The present invention relates to an apparatus and method for preventing lubricant from leaking from a lubricant sump. More specifically, the invention includes an annular fluid seal containing a windback device, referred to as merely a "windback" positioned within a sump housing, which may be between a high pressure area and a low pressure area. Preferably, the windback is positioned around a rotating shaft that extends between a high and low pressure areas so as to isolate a lubricant sump. A plurality of inclined threads are formed on an inner face of the windback and are angled such that lubricant or other fluid splashed from the rotating shaft is directed away from a shaft sealing element of the annular fluid seal and through leak off slots leading to the sump housing chamber. Accordingly, the windback design of the present invention prevents the lubricant from leaking out of the isolated sump by way of the rotating shaft.

Figure 2:
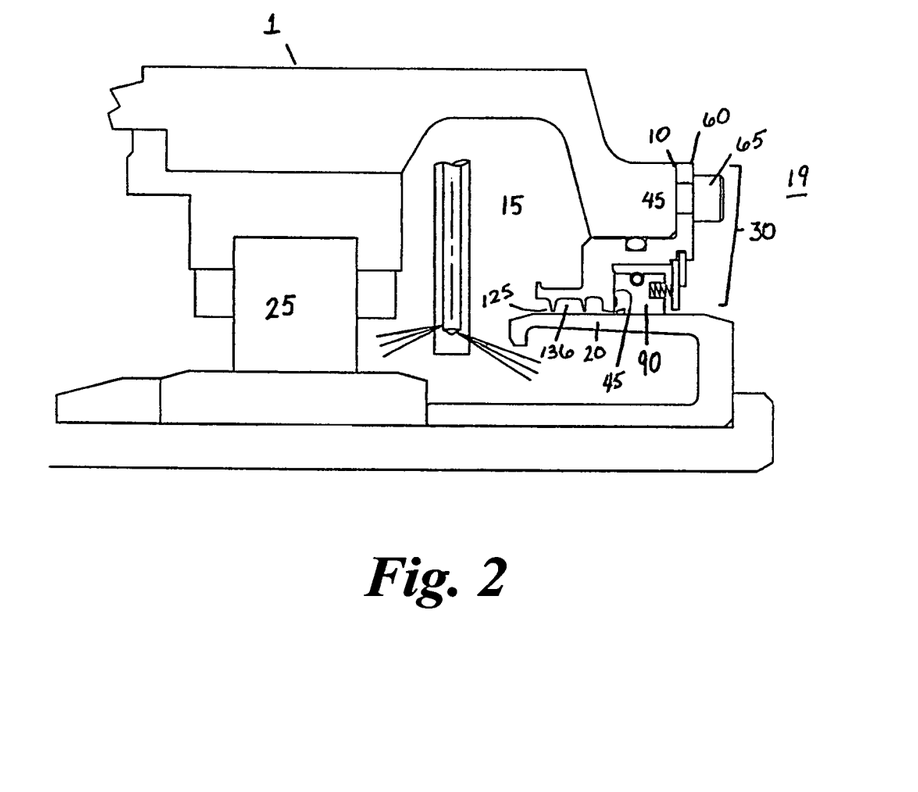
FIG. 2 is a vertical section of a sump housing, seal assembly, runner, and bearing coupled to form a sump chamber.

Referring to FIG. 2, one aspect of a turbine engine is illustrated as containing a windback of the present invention. More specifically, the present invention is illustrated with a sump housing 1, a runner 20, a bearing assembly 25, and a fluid seal assembly 30. The sump housing 1 is of an annular configuration substantially surrounding the runner 20 which passes through an open end of the housing. The housing 1 is provided with a necked-down portion and a shoulder 10 which is adapted to be coupled to the annular fluid seal assembly 30 (see below) such that the seal assembly 30 substantially seals the area around the runner 20 and the open end of the sump housing 1. One or more bearing assemblies 25 interface between the sump housing 1 and the runner 20. The bearing assemblies 25 may be comprised of conventional ball bearings or any bearing understood in the art to support the rotation of the runner 20. The sump housing 1, runner 20, fluid seal assembly 30, and bearing assemblies 25 are all coupled so as to form a sealed chamber or lubricant sump 15, which is preferably a low pressure area containing a lubricating fluid, such as oil. In one embodiment, the chamber 15 separates the lubricant, e.g. oil, from a high temperature and/or high pressure gaseous environment. For example, in the context of a gas turbine applications, e.g. aircraft engines, it is important to prevent oil lubricant from mixing with the high temperature gases present at the exterior side of the sump housing 1 and proximal to the fluid seal assembly 30. Typically, such high temperature/high pressure gases are contained within a chamber (not illustrated) on a gas side of the turbine, denoted by reference 19. Mixing of oil and hot gases may cause oil cooking and an engine fire. Accordingly, the configuration of the present invention isolates the lubricant within chamber 15 and utilizes a seal 90 and a windback 40 on the fluid seal assembly 30 to prevent lubricant from escaping along the runner 20 between the runner 20 and the fluid seal assembly.

Figure 3:
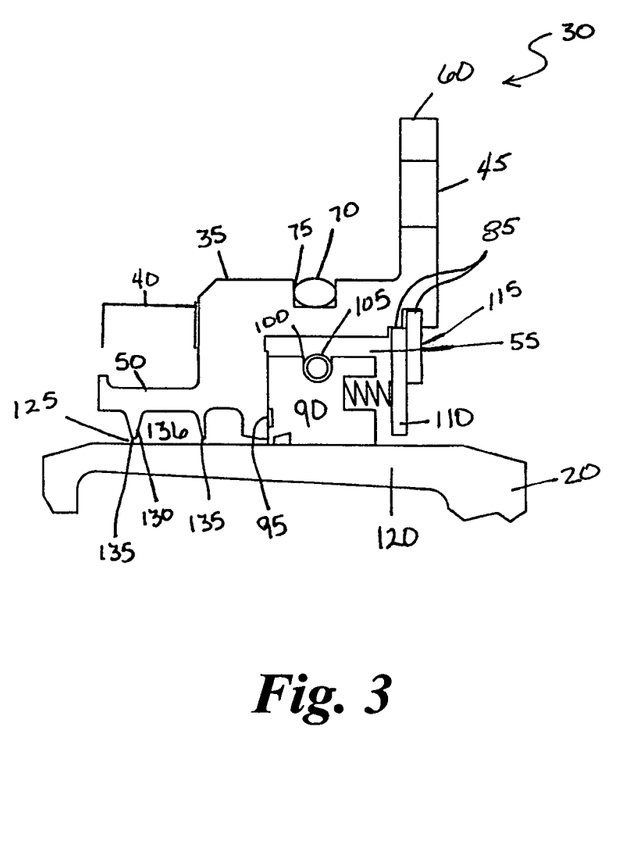
FIG. 3 is a vertical section of a seal assembly and a shaft.

Referring to FIG. 3, the fluid seal assembly 30 is comprised of an annular fluid seal housing 35 flanked by a flange 60 at a first end and a windback 40 at an opposing second end. The annular fluid seal housing 35 is adapted to receive and sealingly engage the runner 20, as discussed below. Extending from one end of the fluid seal housing 35 is an annular flange 60. The flange 60 extends radially from the fluid seal assembly 30 and is also adapted to substantially surround the runner 20. When the fluid seal assembly 30 is installed within the sump housing 1 (as illustrated in FIG. 2), the flange 60 contacts the shoulder 10 of the sump housing 1. In one embodiment, the shoulder 10 of the sump housing 1 and the flange 60 are adapted to be coupled to one another. For example, referring to FIG. 2, a plurality of recesses (not illustrated) complementary to a plurality of holes 45 in the flange 60 may be formed integrally within the shoulder 10 of the sump housing 1 and may be adapted to couple to flange 60 to the shoulder 10. Specifically, the flange 60 may be coupled to the shoulder 10 by a plurality of bolts 65 passing through the holes 45 of the flange 60 and threadingly engaging the recesses in the shoulder 10 of the sump housing 1. However, the invention is not limited to this embodiment and the flange 60 may be coupled to the shoulder 10 by a screw, clasp, strap, or any other means understood in the art to secure the flange to a shoulder 10. Moreover, the invention is not limited to a recess within the shoulder 10. Rather, the shoulder 10 may also comprise a hook, screw, bolt or the like extending therefrom wherein the hook, screw, bolt, etc. is adapted to pass through the holes 45 in the flange 60. An external means such as a nut, clasp, strap, retention ring, or the like may then be utilized to further secure the flange 60 to the shoulder 10. Regardless of the type of securing mechanism, the action of securing the flange 60 to the shoulder 10 functions to secure the fluid seal assembly to the housing 1.

Referring again to FIG. 3, the fluid seal housing 35 contains a sealing mechanism 70 such as, but not limited to, an O-ring, or other similar sealing ring, located within a groove or recess 75 of the fluid seal housing 35. The groove 75 and sealing mechanism 70 extend along the fluid seal housing 35 such that, when the fluid seal assembly 30 is secured to the sump housing 1 (by way of the flange), the sealing mechanism 70 sealingly engages an aspect of the shoulder 10. This sealing engagement of the sealing mechanism 70 prevents leakage of the lubricant within chamber 15 through the space between the fluid seal housing 35 and sump housing 1.

The annular fluid seal housing 35 is adapted to form a bore passing substantially through the center of the seal housing 35 and leading to an annular seal cavity 55. The bore is sized to receive and allow the runner 20 to pass therethrough and the seal cavity 55 is adapted to receive a seal assembly. More specifically, the fluid seal housing 35 extends radially around the runner 20 so as to form an annular seal cavity 55 containing a plurality of radial seal-receiving grooves 85 proximal to the flange 60. Based on the foregoing, the sealing cavity 55 and seal-receiving grooves 85 extend co-axially with the fluid seal housing 35 such that the seal cavity 55 and stepped seal-receiving grooves 85 substantially surround the runner 20 and are adapted to receive one or more segments of an annular sealing ring. The resulting diameter of the seal cavity 55 may be of any diameter understood in the art to support a sealing assembly and, ultimately, to seal the lubricant chamber 15 within the housing 1. However, in a non-limiting example, the diameter created by the seal cavity 55 is such that it is larger than the diameter of the space created by the windback 40.

The seal 90 is adapted to fit within the seal cavity 55 such that the seal 90 is held in place by both a cavity wall and the stepped seal-receiving grooves 85. More specifically, the seal 90 may fit within the seal cavity such that it substantially surrounds the runner 20 and isolates the fluid within chamber 15. In one embodiment, the seal 90 may be comprised of a plurality of segmented seal rings (not illustrated) wherein the segments are coupled together forming a ring. For example, the seal rings may be a segmented carbon seal ring design such as the assembly illustrated in FIGS. 1 through 4 of U.S. Pat. No. 4,082,296, the contents of which are incorporated herein by reference. The seal 90 may be formed from carbon or carbon-graphite or any material understood in the art for a sealing surface within a chamber and along a runner or shaft. The seal ring may have an outer diameter slightly smaller than the diameter of the seal cavity 55 and has an inner diameter that is approximately the same diameter as the runner 20. Along the outer diameter of the seal 90 is a recess 100. The recess 100 is adapted to receive a device that mechanically urges the seal segments against the runner surface 20. In a non-limiting example, as shown in FIG. 3, the device may be comprised of a circular coil spring 105 wherein the spring serves to urge the seal segments against the runner 20, while not inhibiting the rotation of the runner 20 yet still allowing the segments to expand or contract with the runner 20 as necessary. For example, the coil spring 105 may be adapted to allow the sealing segments to expand during rotation of the runner 20. This expansion allow for the creation of an air bearing around the shaft and between the expanded sealing segments and the shaft. Such an air bearing is taught in U.S. Pat. No. 5,284,347, the contents of which are incorporated by reference. The present invention, however, is not limited to a coil spring and may be comprised of any device understood in the art to bias or urge seal segments against the runner 20 and/or provide a similar air bearing design.

Isolating and sealing the chamber 15 is further enhanced by biasing the seal 90 against a seal cavity wall 95. Specifically, a seal support ring 110 may be positioned within the seal cavity 55 such that the seal support ring 110 is fixed in position by one of the stepped seal-receiving grooves 85. The seal support ring 110 may be further fixed by a retaining ring 115, desirably a split retaining ring, which is received within another of the stepped seal-receiving grooves 85. As illustrated in FIG. 3, it is desirable that the seal support ring 110 and the retaining ring 115 are affixed within adjacent stepped seal-receiving grooves 85 such that the retaining ring 115 biases the seal support ring 110 toward the seal 90 and the interior of the seal cavity 55. The seal support ring 110 mechanically urges the seal 90 against a seal cavity wall 95 proximal to the windback 40 through a plurality of springs 120. For example, the seal 90 may be urged toward the seal cavity wall 95 by a series of compression springs 120. Each compression spring may extend from a series of pockets or a long continuous groove (not illustrated) along the seal 90 to, ultimately, contact the seal support ring 110. The fixed position of the seal support ring 110 and the retaining ring 115 urges the seal against the seal cavity wall 95 by way of the action of the series of springs 120 retained therebetween. The present invention is not limited in the number of springs utilized; however, it is desirable that a sufficient number of springs be utilized to evenly compress the seal 90 against the seal cavity wall 95 without hindering the ability of the seal 90 to isolate the chamber 15.

The result of biasing sealing segments 90 toward the runner 20 and the seal cavity wall 95 is to increase the efficiency of the seal 90. In other words, the action of the mechanical device, e.g. the coil spring 105, urging the seal segments toward the runner 20 functions to tighten the seal segments around the runner 20 and prevent lubricant from passing between the runner 20 and the seal 90 during non-operation, while facilitating the initiation of an air bearing between the seal and the shaft 20 during operation of the engine. Furthermore, the action of the seal support ring 110, the retaining ring 115 and the springs 120 function to bias the seal 90 against the cavity wall 95 proximal to the windback 40. The effect of this is to contact the seal 90 with the cavity wall 95 so as to prevent the lubricant from leaking between the seal 90 and the seal housing 35 during both non-operation and operation of the turbine engine.

The above embodiment of the sealing housing and cavity are intending only for illustrative purpose. To this end, the present invention is not limited to the above configuration. The seal housing and cavity may be in any similar configuration understood in the art to bias a seal within a housing cavity so as to ensure isolation of the lubricant or fluid within the sump housing chamber 15.

Figure 4:
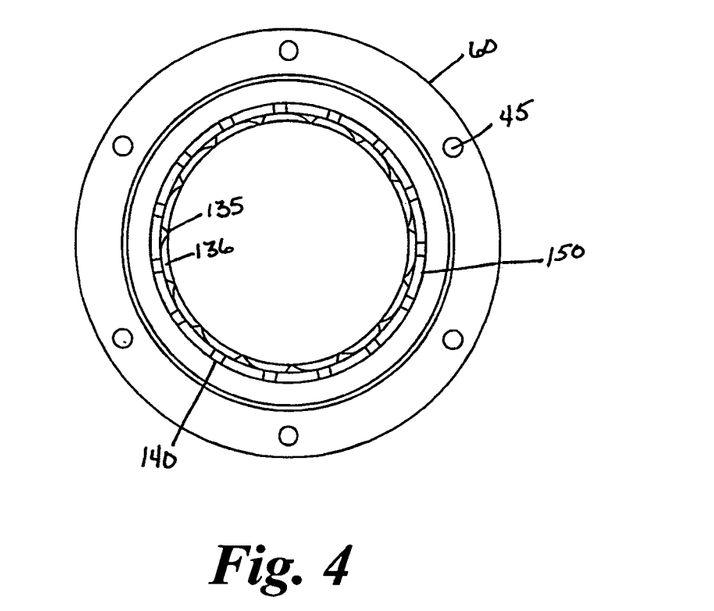
FIG. 4 illustrates a front view of a right hand seal assembly.
Figure 5:
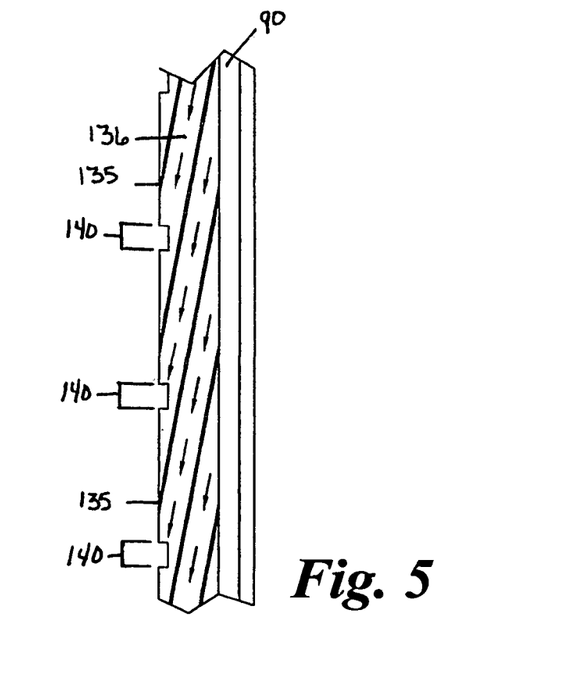
FIG. 5 illustrates a vertical and horizontal section of the inclined threads within the inner face of the windback and the direction of flow of the lubricant along the threads.

The windback 40 is also part of the circumferential seal imposed by the seal assembly 30. More specifically, the windback 40 is comprised of an annular collar 50, forming a bore-like opening 125 therethrough that is adapted to receive the runner 20 within. Referring to FIGS. 4 and 5, the inner face 130 of collar 50, which faces runner 20, is provided with a plurality of inclined threads 135, preferably 1-24 threads, formed by a plurality of ridges 136 spaced about the inner face 130 of the collar. Specifically, the ridges are adapted to from a plurality of canal-like threads extending at oblique angles, relative to the longitudinal axis of the runner 20, and spaced along the entire inner face 130 of the windback. Preferably, the ridges 136 form inclined threads that extend from an end of the windback proximal to the seal cavity 55 to an opposing end of the windback distal to the cavity. These inclined threads function assist lubricant to flow back into chamber 15.

Referring to FIGS. 4 and 5, at the sump end of each inclined thread 135 there is provided a radially extending leak off slot 140. Each leak off slot assists in directing the lubricant as it leaves the thread 135 back to the sump chamber 15. To this end, the inclined threads urge the lubricants away from the face of the seal 90 and toward the leak off slots 140, as indicated by the directional arrows of FIG. 5. In one embodiment, the inclined threads 135 may be parallel to each other and are spaced apart equally about the entire circumference of the inner face 130 of the collar 50.

Figure 6:
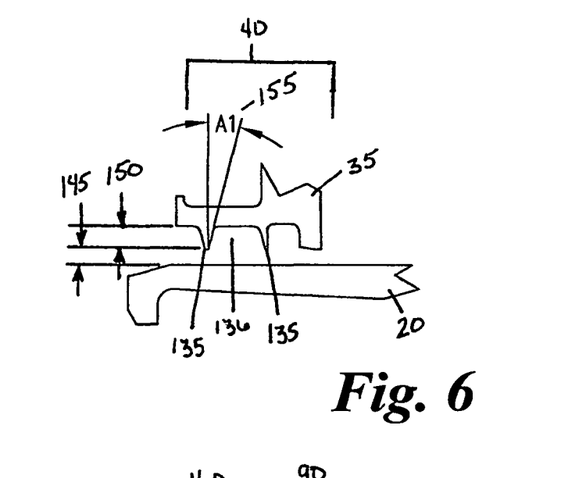
FIG. 6 illustrates a vertical section of a windback device and a runner.
Figure 7:
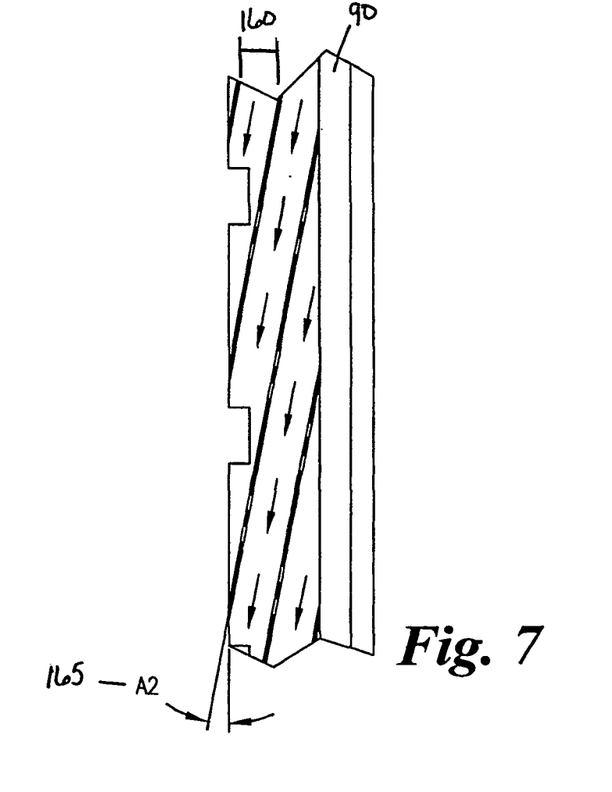
FIG. 7 illustrates a vertical and horizontal section of equally spaced inclined threads within the inner face of the windback.

Referring to FIGS. 6 and 7, the radial clearance 145 of the windback is the clearance between the runner 20 that passes through the bore of the sealing housing 35 and the ridges 136 of the windback 40, when the seal assembly 30 is coupled to the sump shoulder 10. Generally, the radial clearance 145 is determined by the engine shaft radial run-out, relative to the stationary windback's inside diameter and material thermal expansion rates. Optimal radial clearance is, therefore, dependant upon, at least, the diameter of the runner 20 and the pressure created by windage or sheer forces from the rotation of the runner 20. However, other considerations to determining a proper radial clearance include fluid flow coefficients, flow factors, Reynolds Number, wetted parameters, fluid properties, shaft velocity, cross sectional flow area, groove width and depth, and the rotating surface area. Taking each of these factors into consideration, the preferred radial clearance of the present invention is a distance wherein the inclined thread 135 of the windback may still receive lubricant deposited therein by windage created from the rotation of the runner 20 and the resulting shearing forces created by the rotation of the runner 20 force the fluid to travel along the threads 135 toward the leak-off slots 140. As such, the desired radial clearance is static only for a given application, and may be varied in accordance with the foregoing parameters for each unique application.

Figure 8A:
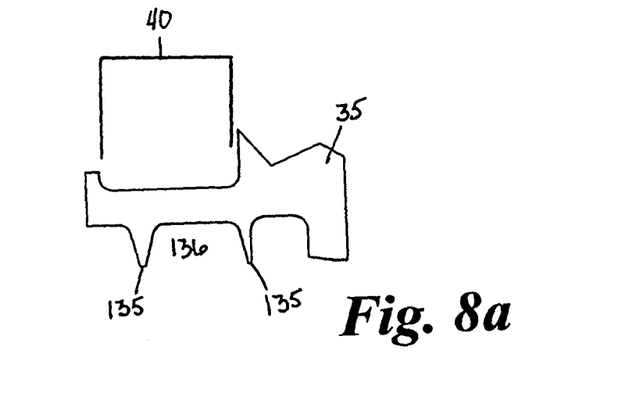
FIG. 8A illustrates a windback with equally sized ridges.
Figure 8B:
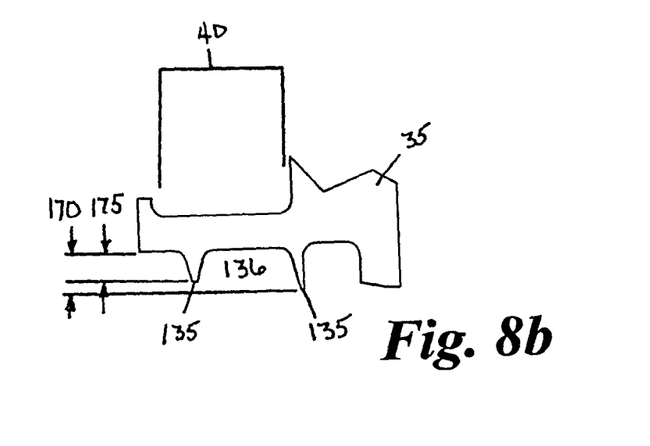
FIG. 8B illustrates a windback wherein the ridges form a positive incline angle.
Figure 8C:
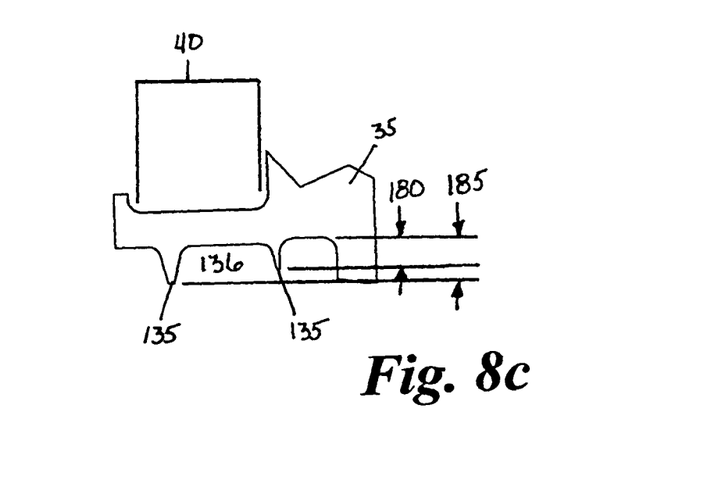
FIG. 8C illustrates a windback wherein the ridges form a negative incline angle.

The depth 150, width 160, taper of the ridge (as denoted by A1 of FIG. 6) 155, and circumferential or pitch angle 165 of the inclined threads 135 may adjusted based on the particular application of the windback. Specifically, these measurements may be tailored based on factors such as the speed of rotation of the runner 20, engine operating conditions, pressure, temperature, flow velocity of the lubricant or similar parameters which affect the windage, shear forces, and/or flow of the lubricant to optimize the efficiency of the multiple inclined threads 135. Referring to FIG. 8A, the ridges 136 of the windback inclined threads 135 may be of the same size, e.g. same depth 150 and taper angle (A1), such that the resulting thread depth and taper is bi-symmetrical along the longitudinal axis of the thread. However, the present invention is not limited to this embodiment. Referring to FIG. 8B, the ridges 136 may be adapted to form a positive incline angle with respect to the chamber 15. To this end, the depth 170 of the ridge 136 proximal to the seal housing 35 is greater than the depth 175 of the ridge 135 distal to the seal housing 35. Conversely, referring to FIG. 8C, the ridges 136 may be adapted to form a negative incline angle with respect to the chamber 15. To this end, the depth 180 of the ridge 136 proximal to the seal housing 35 is less than the depth 185 of the ridge 135 distal to the seal housing 35.

Figure 9:
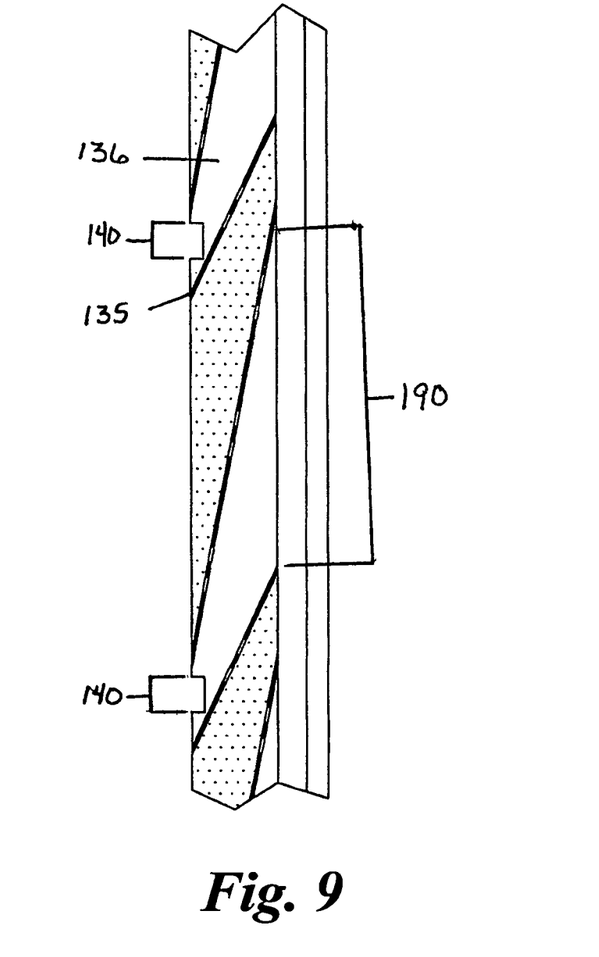
FIG. 9 illustrates a vertical and horizontal section of uniquely spaced inclined threads within the inner face of the windback

In another embodiment, referring to FIG. 9, the ridges 136 defining each thread 135 are not parallel. Rather, the ridges 136, and ultimately the inclined threads, may each be at a different oblique pitch angles with respect to each other. To this end, the width 190 and/or pitch angle of each resulting inclined thread 135 is unique to that particular thread. Because each thread is unique, the threads 135 may taper to create varying sized leak off slots 140. In one preferred embodiment, these threads are tilted toward the oil side of the engine to help restrict the movement of oil away from the air side when the seal housing is in close proximity to a bearing and there is a large amount of oil splash. Conversely, in conditions with slower shaft speeds or lower differential pressure and less air leakage to move the oil away from the air side, the threads on the oil side may be adapted to create a funnel-like shape so as to increase the air flow and velocity within the threads of the windback. To this end, one of ordinary skill in the art will appreciate that these considerations may be taken into account when determining the direction and angle of the threads.

As noted above, the desired taper, width, depth, pitch angle, etc. for each inclined thread is only static with respect to particular applications of the invention. Accordingly, one of ordinary skill in the art will appreciate that these measurements may be tailored utilizing any of the parameters discussed above so as to achieve an efficient return of the splashed lubricant to the lubricant sump.

In operation, referring to FIG. 2, runner 20 passes through the sump housing 1 and seal assembly 30 and is rotatable therein by virtue of one or more bearing assemblies 25. The chamber 15 may receive an appropriate lubricant, to provide reduced friction and extend the life of the bearing assemblies 25 and the runner 20. Lubricants, in many examples, comprise liquids such as, but not limited to, oil which serve to maintain the bearings, but which should be retained within the chamber 15 of the sump housing 1. In furtherance of this purpose, seal assembly 30 is mounted on the housing shoulder 10 such that the windback 40 and seal 90 substantially surround and are co-axial with the runner 20. Additionally, as discussed above, the seal 90 is biased toward the runner 20 and may allow for formation of an air bearing during engine operation. The seal 90 is also biased toward the seal cavity wall 95 to prevent the passage of lubricant out of the housing chamber 15. During rotation of runner 20, lubricant escaping from the chamber typically does so through the radial clearance 125 between the windback 40 and the runner 20. In the present invention, windage created by the rotation of the runner 20 serves to splash this lubricant onto the inclined threads 135 of the windback 40. The shear forces resulting from the rotation of the runner 20 urge the lubricant along the inclined threads 135. Due to the pitch angle of the inclined threads 135, the lubricant is directed away from the seal 90 and toward each thread's respective leak off slot 140. To this end, the lubricant is urged through the leak off slots 140 and back into the chamber 15. Accordingly, the inclined threads prevent the lubricant from contacting the seal 90 and/or escaping the sump chamber 15.

Figure 10:
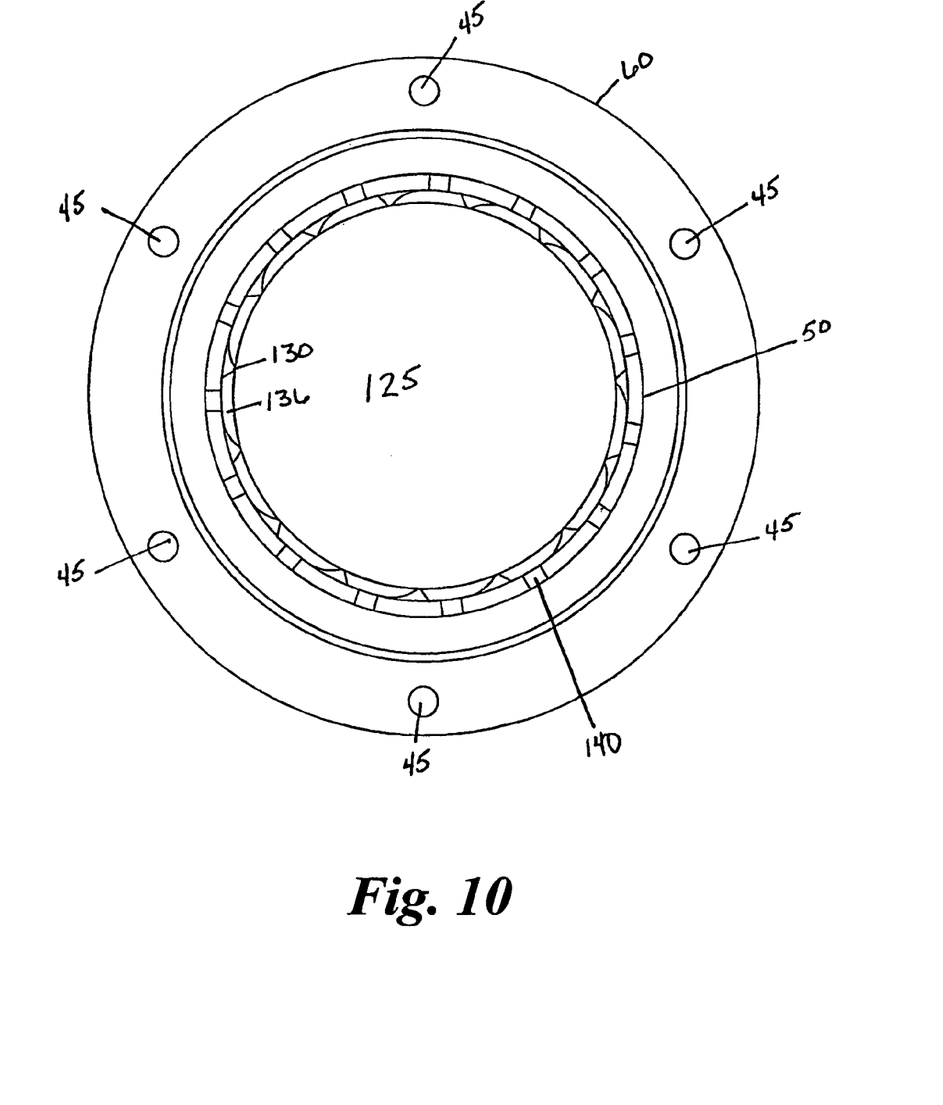
FIG. 10 illustrates a front view of a left hand seal assembly.

As noted above, the ability of the present invention to return the lubricant back to the chamber 15 is dependant upon the windage created by the runner 20. This windage is created based upon the direction of rotation of the runner 20. To this end, in order to properly return the lubricant to the chamber 15, the windback 40 and pitch angle of the inclined threads 135 are also dependant upon the direction of rotation of the runner. Preferably, the pitch angle of the inclined threads 135 is such that the threads are angled with the direction of rotation of the runner 20 such that the resulting windage and sheer forces urge the lubricant away from the seal 90. The windback 40 may, therefore, employ either a right hand thread (as illustrated in FIG. 4) or a left hand thread (as illustrated in FIG. 10) depending upon the direction of rotation of the runner 20. For a shaft rotating clockwise, the pitch angle of the thread would be a right hand thread in the axial direction toward the seal assembly 30, thus pushing droplets of lubricant toward the chamber 15. For counterclockwise rotation of the runner 20, the pitch angle of the thread would be the opposite to achieve this result.

The above embodiments of the present invention are advantageous because the dimensions of each inclined thread and numerous leak off slots increase windage pumping efficiency and facilitate more efficient lubricant return. As shown above, existing windback designs all require oil droplets to travel through the entire circumferential distance of the thread before exiting from the windback and current existing designs only contain one leak off slot, if any. The windback design of the present invention shortens the circumferential angle of the inclined threads such that oil travels less distance to return to the chamber. This reduced angle combined with individual leak off slots for each inclined thread yields an increase in the windage pumping efficiency of the windback and prevents lubricant from contacting the seal surrounding the runner. Additionally, the multiple inclined thread windback does not need a larger axial space to include the inclined threads within the windback and, ultimately, the housing. This saves space and weight within a vehicle containing the housing, such as, but not limited to, an aircraft engine. Weight and space reduction in the engine improves engine efficiency.

As noted above, the variations in depth, width, and angle of the inclined threads may all be adjusted based upon specific parameters such as, but not limited to, shaft speed, temperature, pressure differentials, or the like. Accordingly, one of ordinary skill in the art may modify these parameters to achieve similar efficiency in varying conditions, regardless of the application.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

EXAMPLES

Example 1

Dimensions of Windbacks Tested

Nine different windback designs of various pitch angles and numbers of inclined threads were tested against standard designs for evaluating the improved efficiency and effective flow rates of the inclined threads. These designs include a 0.06 inch pitch windback design (No. 14167-12), a 6 inclined thread windback design (No. 14167-02), a tapered bore windback design (No. 14167-13), a standard windback design (No. 14167-01), a 3 inclined thread windback design (No. 14167-07), (0.125 inch) pitch windback design (No. 14167-11), a 4 inclined thread windback design (No. 14167-10), a 6 inclined thread windback design (No. 14167-09), a 24 inclined thread windback design (No. 14167-14), and a 12 inclined thread windback design (No. 14167-08). These improved thread designs, and the standard design, were machined into windbacks in accordance with the present invention. The specific dimensions of each windback, including thread diameter, radial clearance, axial length, angular thread spacing, angular thread span, pitch and thread angle, are indicated in Table 1 below. Each of these designs was tested in accordance with the procedures set forth herein.

4,000 rpm and baseline air flow measurements were taken at 5 minute intervals for 20 minutes. The shaft was then rotated at 6,000 rpm and baseline air flow measurements were taken at 5 minute intervals for 20 minutes. The shaft was then rotated at 9,000 rpm and baseline air flow measurements were taken at 5 minute intervals for 20 minutes. The shaft was then rotated at 12,000 rpm and baseline air flow measurements were taken at 5 minute intervals for 20 minutes.

Each of these testing procedures were completed for all 10 of the windback designs listed in table 1 above.

Example 3

Results of Testing Procedures

Figure 13:
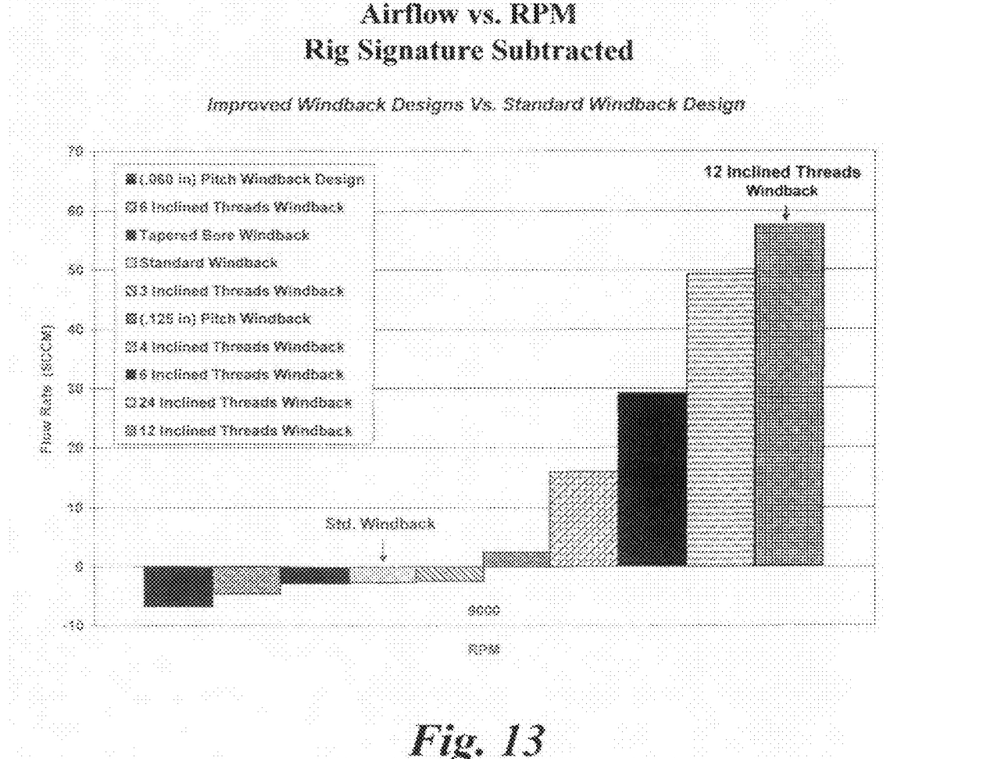
FIG. 13 illustrates respective flow rates of each windback design tested and compared against the flow rates of standard windback designs.

As illustrated in FIG. 13, the results of the foregoing testing procedures indicate that windback designs with 12, 24, 6, 4, and 3 inclined threads all had a greater flow efficiency than the

TABLE 1

| Item | Windback No. | Thread Inside Diameter in inches | Radial Clearance Over Runner in inches | Axial Length of Threaded Area in inches | No. of Threads | Angular Thread Spacing in degrees | Angular Thread Span in degrees | Pitch in inches | Thread Angle in degrees |
|---|---|---|---|---|---|---|---|---|---|
| 1 | 14167-12 | 7.14 | 0.02 | 0.35 | 1 | N/A | 360 | 0.06 | 0.1533 |
| 2 | 14167-02 | 7.16 | 0.03 | 0.272 | 6 | 60 | 90 | 0.18 | 2.7692 |
| 3 | 14167-13 | N/A | 0.03 | | Tapered Bore Windback Design | | | | |
| 4 | 14167-01 | 7.16 | 0.03 | 0.272 | 1 | N/A | 360 | 0.125 | 0.3193 |
| 5 | 14167-07 | 7.16 | 0.03 | 0.272 | 3 | 120 | 180 | 0.18 | 1.3854 |
| 6 | 14167-11 | 7.14 | 0.02 | 0.35 | 1 | N/A | 360 | 0.125 | 0.3193 |
| 7 | 14167-10 | 7.14 | 0.02 | 0.35 | 4 | 90 | 120 | 0.262 | 2.6801 |
| 8 | 14167-09 | 7.14 | 0.02 | 0.35 | 6 | 60 | 90 | 0.233 | 3.5714 |
| 9 | 14167-14 | 7.14 | 0.02 | 0.35 | 24 | 15 | 45 | 0.115 | 7.1153 |
| 10 | 14167-08 | 7.14 | 0.02 | 0.35 | 12 | 30 | 45 | 0.233 | 7.1153 |

Example 2

Testing Procedures

Figure 11:
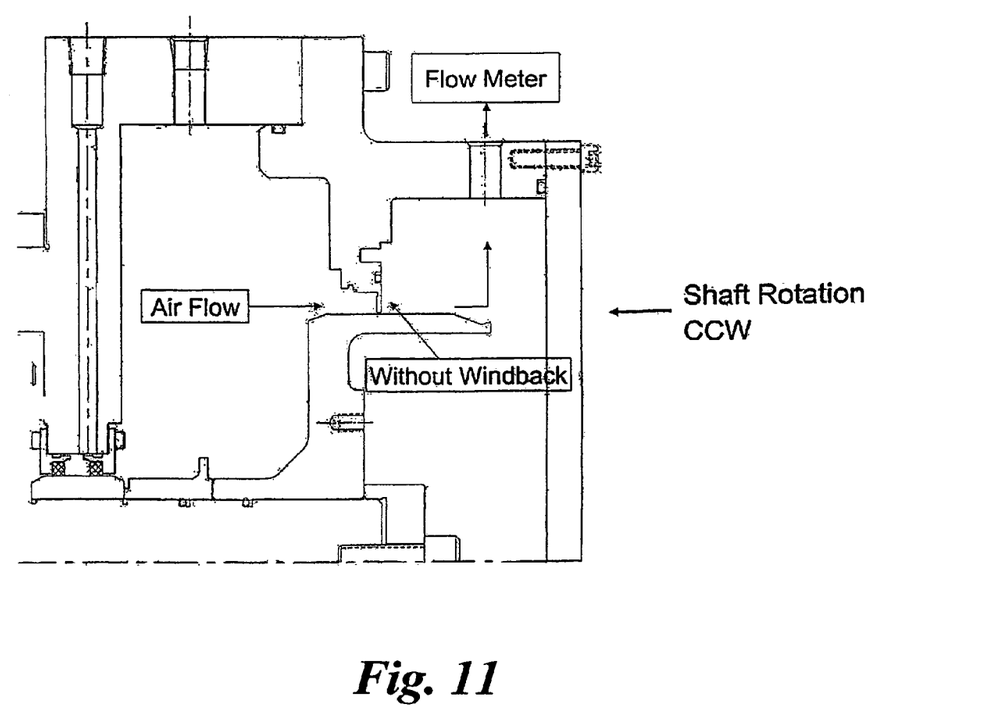
FIG. 11 illustrates the testing chamber used to test the windback designs of the present invention without a windback installed therein.

Prior to testing the foregoing 10 windback test designs a dry dynamic test was performed without a windback to establish the baseline flow rates associated with the shaft rotation. More specifically, referring to FIG. 11, a test chamber was prepared without a windback and the air flow, indicated by the arrows of FIG. 11, generated from the rotation of the shaft was measure by a flow meter. The shaft was rotated in an environment with no PSID, as measured by a water manometer, with a set slave seal buffer at 10 psig. The seal chamber was vented to the atmosphere and no oil was fed through the runner. The shaft was then rotated at 2,000 rpm and baseline air flow measurements were taken at 5 minute intervals for 20 minutes. The shaft was then rotated at 4,000 rpm and baseline air flow measurements were taken at 5 minute intervals for 20 minutes. The shaft was then rotated at 6,000 rpm and baseline air flow measurements were taken at 5 minute intervals for 20 minutes. The shaft was then rotated at 9,000 rpm and baseline air flow measurements were taken at 5 minute intervals for 20 minutes. The shaft was then rotated at 12,000 rpm and baseline air flow measurements were taken at 5 minute intervals for 20 minutes.

Figure 12:
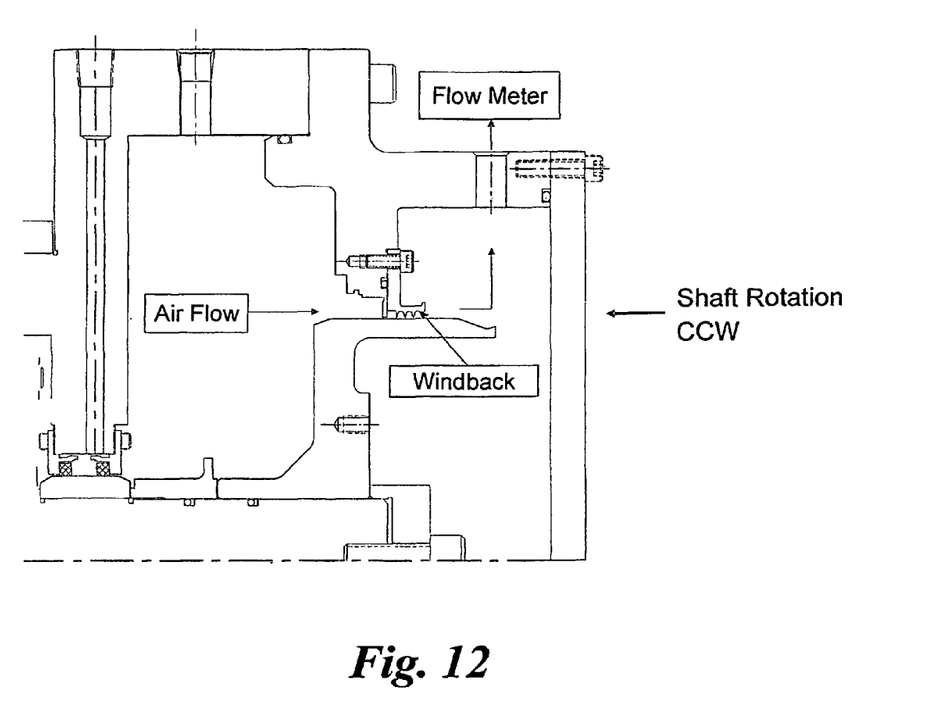
FIG. 12 illustrates the testing chamber used to test the windback designs of the present invention with a windback installed therein

Once the baseline measurements were obtained, the first windback design (No. 14167-12) was secured around the shaft, as illustrated in FIG. 12, and the air flow, indicated by the arrows of FIG. 12, generated from the rotation of the shaft was measure by a flow meter. The shaft was rotated at 2,000 rpm and baseline air flow measurements were taken at 5 minute intervals for 20 minutes. The shaft was then rotated at standard windback design. Additionally, the windback with the 0.125 pitch angle also provided greater flow efficiency. Accordingly, the results of the testing procedure confirmed that the threads of the present windback design alter the air flow rate generated by the rotation of the runner with greater efficiency that those designs known in the art. Accordingly, the present windback device redirect fluid entering the space between a windback and the shaft back into the sump with greater efficiency that the standard windback designs.

We claim:

1. A windback device comprising:
an annular collar having an opening therethrough wherein said opening is sized to receive a rotatable runner without contact; and
a plurality of ridges defining a plurality of inclined threads oriented circumferentially, each said inclined thread separately extending from an inner face of said annular collar toward said rotatable runner and oriented along said inner face at an oblique pitch angle with respect to a rotational axis of said rotatable runner, any two adjacent said inclined threads partially overlapping along a portion of a circumference of said annular collar, each said inclined thread having a leak-off slot at one end of said annular collar, each said inclined thread separated from said rotatable runner via a radial clearance, each said inclined thread separately assists a lubricant away from a seal, wherein a depth along each said ridge varies so as to create a positive incline angle or a negative incline angle from one end of each said inclined thread to another end thereof and between adjacent said inclined threads.

2. The windback device of claim 1, wherein said ridges are sized and spaced equally along said inner face such that said inclined threads are of an equal width, taper angle and pitch angle.

3. The windback device of claim 1, wherein said ridges are sized and spaced equally along said inner face such that each said inclined thread is bi-symmetrical along a longitudinal axis thereof.

4. The windback device of claim 1, wherein said oblique pitch angles vary between two or more said inclined threads.

5. An apparatus for preventing a lubricant from leaking from a lubricant sump containing a rotatable runner to an annular fluid seal assembly comprising:
    an annular seal housing adapted to receive said rotatable runner and forming a cavity between said annular seal housing and said rotatable runner;
    an annular flange extending from said annular seal housing and coupling said annular fluid seal assembly to said lubricant sump;
    an annular seal sized to substantially surround said rotatable runner and fit within said cavity such that said annular seal isolates said lubricant sump from said cavity; and
    an annular windback extending from an inner face along said annular seal housing toward an interior of said lubricant sump wherein said annular windback is co-axial with said rotatable runner, said annular windback including a plurality of ridges defining a plurality of inclined threads oriented circumferentially, each said inclined thread oriented at an oblique pitch angle with respect to a rotational axis of said rotatable runner, any two adjacent said inclined threads partially overlapping along a portion of a circumference of said annular seal housing, each said inclined thread oriented such that said lubricant splashed from said rotatable runner is redirected into said inclined threads, away from said seal, and back into said lubricant sump through a leak-off slot of each respective said inclined thread, wherein a depth along each said ridge varies so as to create a positive incline angle or a negative incline angle from one end of each said inclined thread to another end thereof and between adjacent said inclined threads.

6. The apparatus of claim 5, wherein said inclined threads are angled toward direction of rotation of said rotatable runner such that windage and sheer forces created by rotation of said rotatable runner direct said lubricant back into said lubricant sump.

7. The apparatus of claim 5, wherein said ridges are sized and spaced equally along said inner face such that said inclined threads are of an equal width, taper angle and circumferential angle.

8. The apparatus of claim 5, wherein said ridges are sized and spaced equally along said inner face such that each said inclined thread is bi-symmetrical along a longitudinal axis of said inclined thread.

9. The apparatus of claim 5, wherein said ridges forming said inclined threads are at different circumferential angles along said inner face and relative to a longitudinal axis of said rotatable runner such that each said inclined thread is of a unique width, taper angle, and circumferential angle.

10. A method of removing a lubricant entering an opening between a windback and a rotatable runner comprising:
    redirecting said lubricant entering said opening to a plurality of inclined threads separately spaced along an inner face of said windback using windage created from said rotatable runner, each said inclined thread separately extends from said inner face toward said rotatable runner and oriented circumferentially along said inner face at an oblique pitch angle with respect to a rotational axis of said rotatable runner, any two adjacent said inclined threads partially overlap along a portion of a circumference of said windback, each said inclined thread has a leak-off slot at one end of said windback, wherein a depth along said plurality of inclined threads varies so as to create a positive incline angle or a negative incline angle from one end of each said inclined thread to another end thereof and between adjacent said inclined threads; and
    urging said lubricant to travel along said inclined threads away from a seal using shear forces created from said rotatable runner such that said lubricant separately exits said inclined threads through said leak-off slots.

11. The method of claim 10, wherein said lubricant travels along said inclined threads at an angle relative to a longitudinal axis of said rotatable runner and with direction of rotation of said rotatable runner.

12. A method of preventing a lubricant from contacting a seal surrounding a rotatable runner using a windback that extends from a seal housing coaxially with said rotatable runner toward an interior of a lubricant sump comprising:
    redirecting said lubricant entering an opening between said windback and said rotatable runner to a plurality of inclined threads separately spaced along an inner face of said windback using windage created from said rotatable runner, each said inclined thread separately extends from said inner face toward said rotatable runner and oriented circumferentially along said inner face at an oblique pitch angle with respect to a rotational axis of said rotatable runner, any two adjacent said inclined threads partially overlap along a portion of a circumference of said windback, each said inclined thread has a leak-off slot at one end of said windback, wherein a depth along said plurality of inclined threads varies so as to create a positive incline angle or a negative incline angle from one end of each said inclined thread to another end thereof and between adjacent said inclined threads;
    urging said lubricant to travel along said inclined threads away from said seal using shear forces created from said rotatable runner such that said lubricant separately exits said inclined threads through said leak-off slots; and
    returning said lubricant to said lubricant sump.

* * * * *